(12) United States Patent
Abu El Ata

(10) Patent No.: US 6,311,144 B1
(45) Date of Patent: Oct. 30, 2001

(54) METHOD AND APPARATUS FOR DESIGNING AND ANALYZING INFORMATION SYSTEMS USING MULTI-LAYER MATHEMATICAL MODELS

(76) Inventor: Nabil A. Abu El Ata, 1851 N. 115th Plz., Apt. 3102, Omaha, NE (US) 68154

(*) Notice: Subject to any disclaimer, the term of this patent is extended or adjusted under 35 U.S.C. 154(b) by 0 days.

(21) Appl. No.: 09/127,191

(22) Filed: Jul. 31, 1998

Related U.S. Application Data

(60) Provisional application No. 60/085,350, filed on May 13, 1998.

(51) Int. Cl.$^7$ ............... G06F 7/60; G06F 17/10; G06F 17/48
(52) U.S. Cl. .............. 703/2; 703/6; 703/13; 703/21; 709/220; 709/221; 709/222; 709/223; 709/226; 705/1; 705/7; 705/35
(58) Field of Search .............. 703/22, 13, 14, 703/17, 2, 6; 709/220, 226, 221, 222, 223, 224

(56) References Cited

U.S. PATENT DOCUMENTS

| | | | |
|---|---|---|---|
| 5,276,877 | * | 1/1994 | Friedrich et al. ............ 709/105 |
| 5,446,874 | * | 8/1995 | Waclawsky et al. ............ 714/1 |
| 5,486,995 | * | 1/1996 | Krist et al. ............ 364/149 |
| 5,522,014 | * | 5/1996 | Clark et al. ............ 706/45 |
| 5,726,914 | * | 3/1998 | Janovski et al. ............ 702/84 |
| 5,771,370 | * | 6/1998 | Klein ............ 395/500.34 |
| 5,790,789 | * | 8/1998 | Suarez ............ 709/202 |
| 5,801,958 | * | 9/1998 | Dangelo et al. ............ 364/489 |
| 5,809,282 | * | 9/1998 | Cooper et al. ............ 709/226 |
| 5,881,268 | * | 3/1999 | McDonald et al. ............ 395/500.44 |
| 5,893,074 | * | 4/1999 | Hughes et al. ............ 705/8 |
| 5,953,707 | * | 9/1999 | Huang et al. ............ 705/10 |
| 5,958,009 | * | 9/1999 | Friedrich et al. ............ 709/224 |
| 5,984,511 | * | 11/1999 | Vasey-Glandon et al. ............ 364/512 |
| 5,999,734 | * | 12/1999 | Willis et al. ............ 395/706 |
| 6,003,079 | * | 12/1999 | Friedrich et al. ............ 709/224 |
| 6,009,256 | * | 12/1999 | Tseng et al. ............ 395/500.34 |
| 6,038,540 | * | 3/2000 | Krist et al. ............ 705/8 |

OTHER PUBLICATIONS

"Simulation modeling within workflow technology", Miller et al, Proceedings of the 1995 Winter Simulation Conference, Dec. 3–6, 1995.*

"Analyzing and re-engineering business process using simulation", Bhskar et al., Proceedings of the 1994 Winter Simulation Conference, Dec. 11–14, 1994.*

* cited by examiner

Primary Examiner—Kevin J. Teska
Assistant Examiner—William Thomson
(74) Attorney, Agent, or Firm—Hamilton, Brook, Smith and Reynolds, P.C.

(57) ABSTRACT

An information design system uses an input module, a construction module, a performance metrics module, and an output module to create and output several models of a proposed information design system. The input module receives descriptive input which is validated and transformed into quantitative input. The construction module uses the quantitative input and information from a library of hardware and software component models to create and calibrate one or more models. The performance metrics module calculates performance metrics for the models, which then can be compared based on these metrics. A preferred information system design can then be selected from the models.

24 Claims, 9 Drawing Sheets

METHOD AND APPARATUS FOR DESIGNING AND ANALYZING INFORMATION SYSTEMS USING MULTI-LAYER MATHEMATICAL MODELS

CROSS REFERENCE TO RELATED APPLICATION

This application is based on and claims priority to U.S. Provisional Patent Application Ser. No. 60/085,350, filed May 13, 1998, entitled "Method for Modeling Information Systems for an Organization," the entire contents of which are incorporated herein by reference.

TECHNICAL FIELD

The invention relates to systems and methods for monitoring, managing, and diagnosing information systems, and more particularly to systems and methods for designing and modeling information systems.

BACKGROUND INFORMATION

With the advent of electronic computing, businesses have used computers to track the flow of business information, such as for the flow of trading orders through a stock exchange. The system of computer hardware and software components used for tracking, processing, and recording this information is referred to as an information system. Along with the development of information systems, managers of these systems have developed processes and application software for monitoring the information system itself. With the development of more advanced information systems and the ongoing development of modern commerce, information systems become very large and more complex and may often suffer from inefficiencies or "bottlenecks" that slow or even stop the information system. Monitoring and diagnostic software for information systems has been developed to monitor large information systems and assist managers of the information system in determining solutions to make the systems more efficient. Current monitoring systems generally only identify bottlenecks or help determine where in the information system additional resources, such as additional computing hardware or storage devices, may be needed.

SUMMARY OF THE INVENTION

Known monitoring systems generally are not capable of creating a model of a new information system that accurately models all the data, as well as hardware, software, and business processes, when an existing system to be modified does not already exist. A model of a new information system may be implemented with many different combinations of hardware and software applications, such as different types of software database applications, each combination resulting in different performance characteristics. An object of the invention is to allow designers of new information systems to determine which combination is most advantageous.

Another object of the invention is to provide an initial model of an new information system based on descriptive input provided by a user. Another object is to provide additional models of an information system different from the initial model, which a designer can compare based on the performance of all the models in order to select a preferred model. Yet another object is to provide a number of computed performance metrics that show the performance of the model. Still another object of the invention is to provide a library of hardware and software component models that a designer can use to compare information system models based on different hardware and software combinations.

The invention achieves the above objects by providing systems and methods for designing information systems. An information system designer provides descriptive input about a proposed information system and its architecture, and the information design system of the invention converts the descriptive input into quantitative input. The information design system uses the quantitative input to construct an initial model of a proposed information system, as well as additional models that are variations on the initial model. Performance metrics are calculated for all of the models. The designer then examines the initial model and additional models to select a model to use for implementing the information system, or decides that additional models are needed, in which case the designer requests additional variations on the initial model or changes the assumptions in the descriptive input to initiate a new round of modeling.

In one aspect of the invention, the invention relates to as a system for designing an information system. The system includes an input module for receiving descriptive input about a proposed information system, a construction module for constructing an initial model and additional models of the information system, a performance metrics module for calculating performance metrics for the models, and an output module for outputting the models and their performance metrics. In one embodiment, the input module derives validated input from the descriptive input, and the construction module derives quantitative input from the validated input. In another embodiment, the output module provides a comparison of the models based on the performance metrics, and a designer selects one of the models as a preferred information system design. In another embodiment, the system includes a library including models of hardware and software components, and the construction module uses hardware and software component models selected from the library when constructing the information system models. In a further embodiment, the construction module calibrates the information system models by comparing estimates of performance based on the models with benchmarks from the library. In further embodiments, the system provides performance metrics for an elongation factor, an aging ratio, an efficiency curve, an efficiency ratio, a degradation ratio, and other metrics.

In another aspect, the invention features a method for designing an information system. The method includes receiving descriptive input about processes and data expected to be used in said information system, transforming the descriptive input into quantitative input, constructing an initial model of said information system based on the quantitative input, creating one or more additional models derived from the initial model, calculating performance metrics for the models, and providing the models and their performance metrics as output. In one embodiment, the method includes validating the descriptive input to produce validated input and transforming the validated input into quantitative input. In a further embodiment, the method includes comparing the performance metrics for the models and selecting one of the models as a preferred information system design. In another embodiment, the method includes providing a library of hardware and software components, selecting one or more of the components to use in a model, and creating one or more models based on the selected components. In a further embodiment, the method includes calibrating one or more models by comparing estimates of performance values from the models with benchmarks from the library. In one embodiment, the method includes calculating performance metrics for an elongation factor, an aging ratio, an efficiency curve, an efficiency ratio, a degradation ratio, and other metrics.

BRIEF DESCRIPTIONS OF THE DRAWINGS

The invention is pointed out with particularity in the appended claims. The above and further advantages of this invention may be better understood by referring to the following description taken in conjunction with the accompanying drawings, in which:

DESCRIPTION

The invention relates to a method and system for designing an information system for a use in an organization. The system receives descriptive input about a prospective information system to be designed, validates this information, then transforms the descriptive input into quantitative input, which is used to construct one or more models of an information system.

Figure 1:
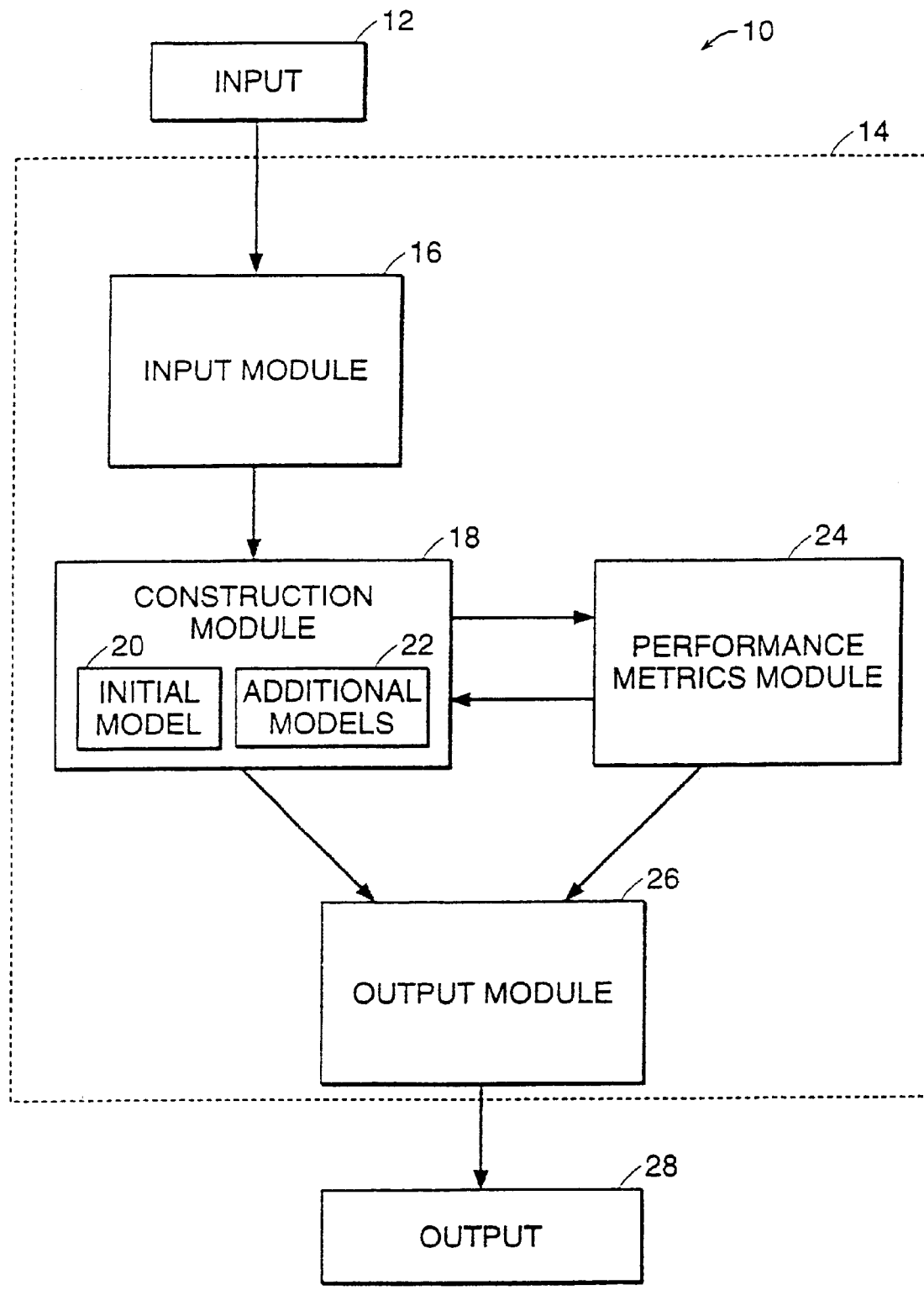
FIG. 1 depicts a functional block diagram of the information design system illustrating an input module, construction module, performance metrics module, and output module, for one embodiment of the invention.

In summary, FIG. 1 depicts a functional block diagram of the information design system 10, for one embodiment of the invention, illustrating input 12, a processor 14, an input module 16, a construction module 18, an initial model 20, additional models 22, a performance metrics module 24, an output module 26, and output 28. In general, the information design system 10 is implemented on a hardware computer system as software modules (shown in FIG. 1 and FIG. 3) executing on a digital data processor in the computer system. In one embodiment, the modules 16, 18, 24, and 26 are implemented on one computer system. In another embodiment, one or more of the modules are implemented on one or more computer systems connected in a local area network (LAN), wide area network (WAN), or a global computer network, such as the Internet. In another embodiment, one or more of the modules (shown in FIG. 1 and FIG. 3) are implemented as hardware devices, such as ASIC (application specific integrated circuits) devices.

The input module 14 receives input 12 from an input device, a network, or a storage device. In one embodiment, a user of the information design system 10 provides the input 12 through a mouse and keyboard connected to the processor 14. The input 12 includes descriptive data that describes the data, transactions, processes, and architecture for a proposed information system to be used in an organization. Typically, the information system is used in connection with a business organization, but may also be provided for other types of organizations, such as an academic, nonprofit, or other types of organizations. In one embodiment, the input 12 is descriptive input that provides a complete description of the business processes within the organization, and is not limited to computer transactions or processes. In one embodiment, the input 12 also includes noncomputer transactions such as paper transactions that do not occur on a computer, and even verbal transactions or processes that occur between people.

In one embodiment, for example, the descriptive input 12 provides a description of the business processes of a stock exchange, and provides a more specific description of specific business processes and functions, such as the stock trading function. This function includes an initial order for a stock trade from a customer, the data associated with the stock trade, the process of transferring the stock trade to a stock exchange, the return of the completed trade from the stock exchange, the credit or debit of the results to the local customer's account, the reporting of the trade to the customer, and any other steps or data required to complete the entire trading process. In one embodiment, this information is provided in descriptive format. For example, the order for a stock trade must be stored in a database entry in the information system, but the descriptive input does not necessarily specify the exact size of the data fields, the exact relations to other data fields, or the type of database application to use to implement the database. In one embodiment of the invention, the user must specify in the input 12 what ancillary data must be associated with the order. In another embodiment, analytic or artificial intelligence software in the information system 10 determines what ancillary information or pointers should also be associated with the stock trade order.

In another embodiment, another example of descriptive input 12 is for a business process, such as one for managing bank customers. The business process may have one or more business functions, such as current account, mortgages, revolving accounts, deposit accounts and/or equity accounts. An information designer provides input for this process as part of the descriptive input 12 and indicates the activity of a typical customer over a month, such as 3 transactions per month for her deposit account, 13 transactions a month for her checking account, and 1 transaction a month for her mortgage account. Transactions may also be represented as percentages. For example, the typical customer is expected to engage in 15 transactions per month, 20% of which (3 per month) are for the deposit account.

Generally, the input module 16 passes on data to the construction module 18, and the data is processed by the construction module 18. The initial model 20 is a quantitative model of the proposed information system created by the construction module 18 based on the descriptive input 12. The construction module 18 may also construct additional models 22 of the proposed information system (see FIG. 2). The construction module 18 then passes on the initial model 20 and additional models 22 to the performance metrics modules 24 for further processing and then to the output module 26 (described in more detail for FIG. 2). The output module 26 provides output 28 to an output device, a network, or a storage device. In one embodiment, the output module provides the output 28 to a display device for the designer of the information design system 10.

Figure 2:
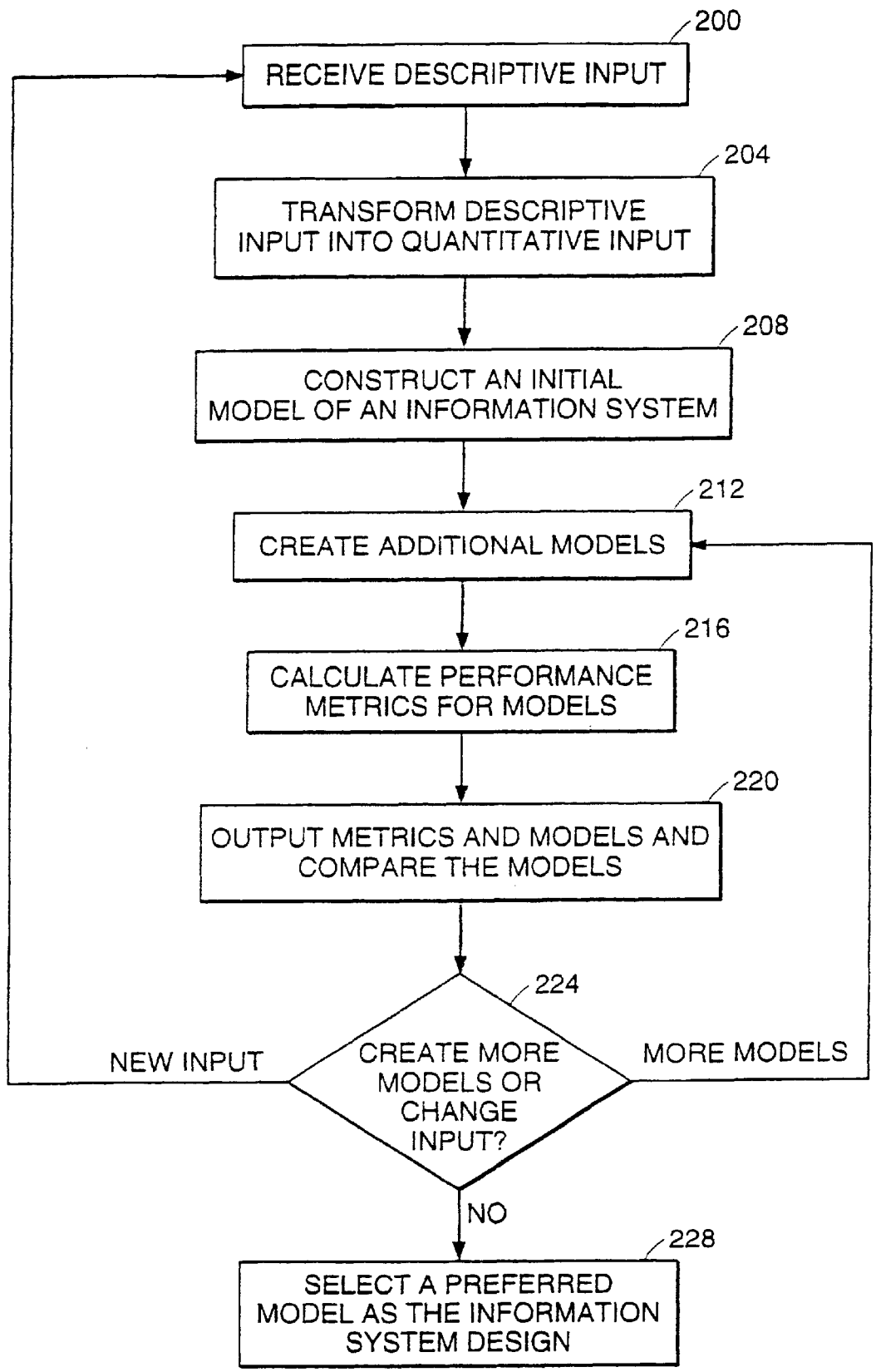
FIG. 2 is a flow diagram depicting the process of information system design according to the embodiment of the invention depicted in FIG. 1.
Figure 3:
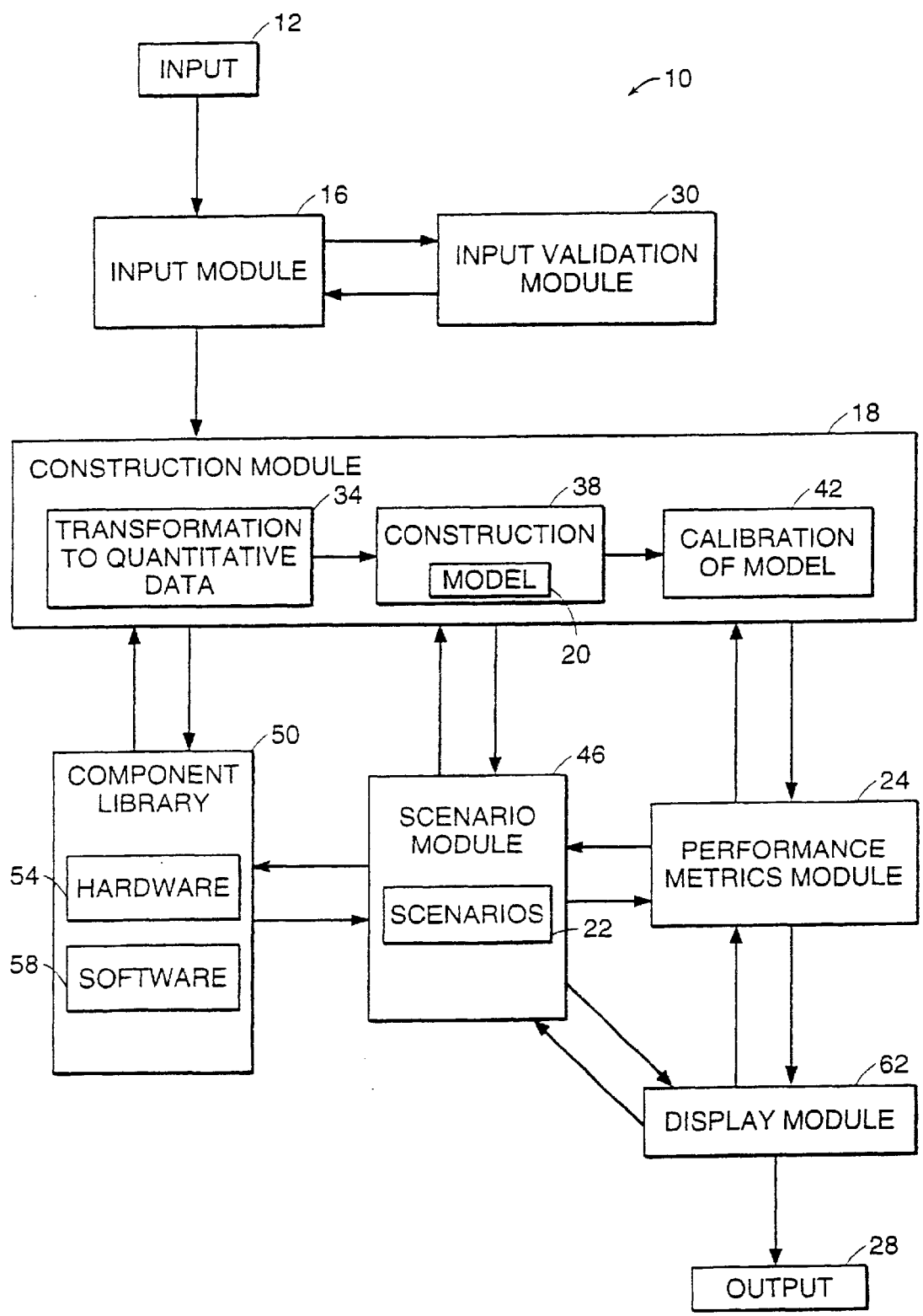
FIG. 3 depicts a functional block diagram of an information design system for one embodiment of the invention.
Figure 4:
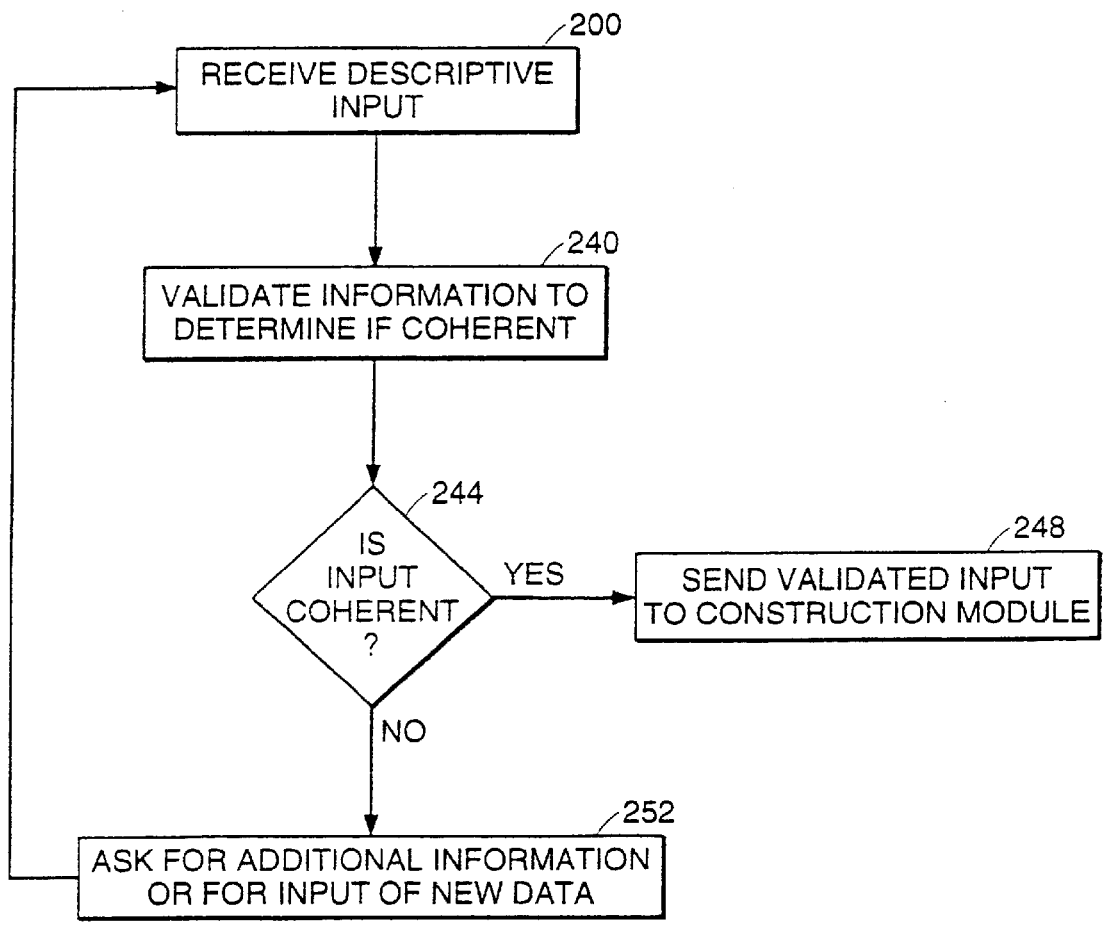
FIG. 4 depicts a flow chart of the input validation process for the embodiment of the information design system illustrated in FIG. 3.
Figure 5:
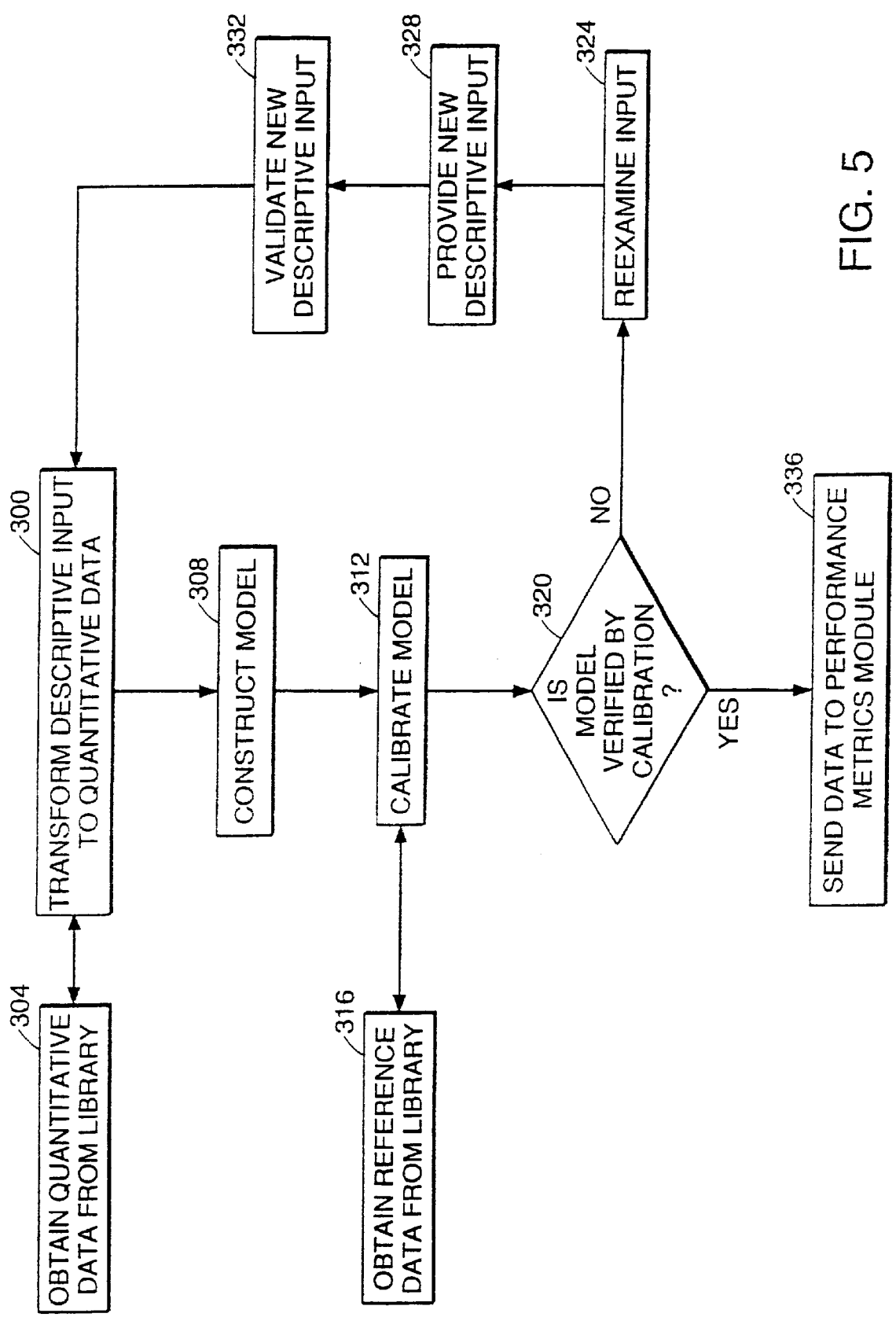
FIG. 5 depicts the process of constructing a model for the embodiment of the invention illustrated in FIG. 3.
Figure 6:
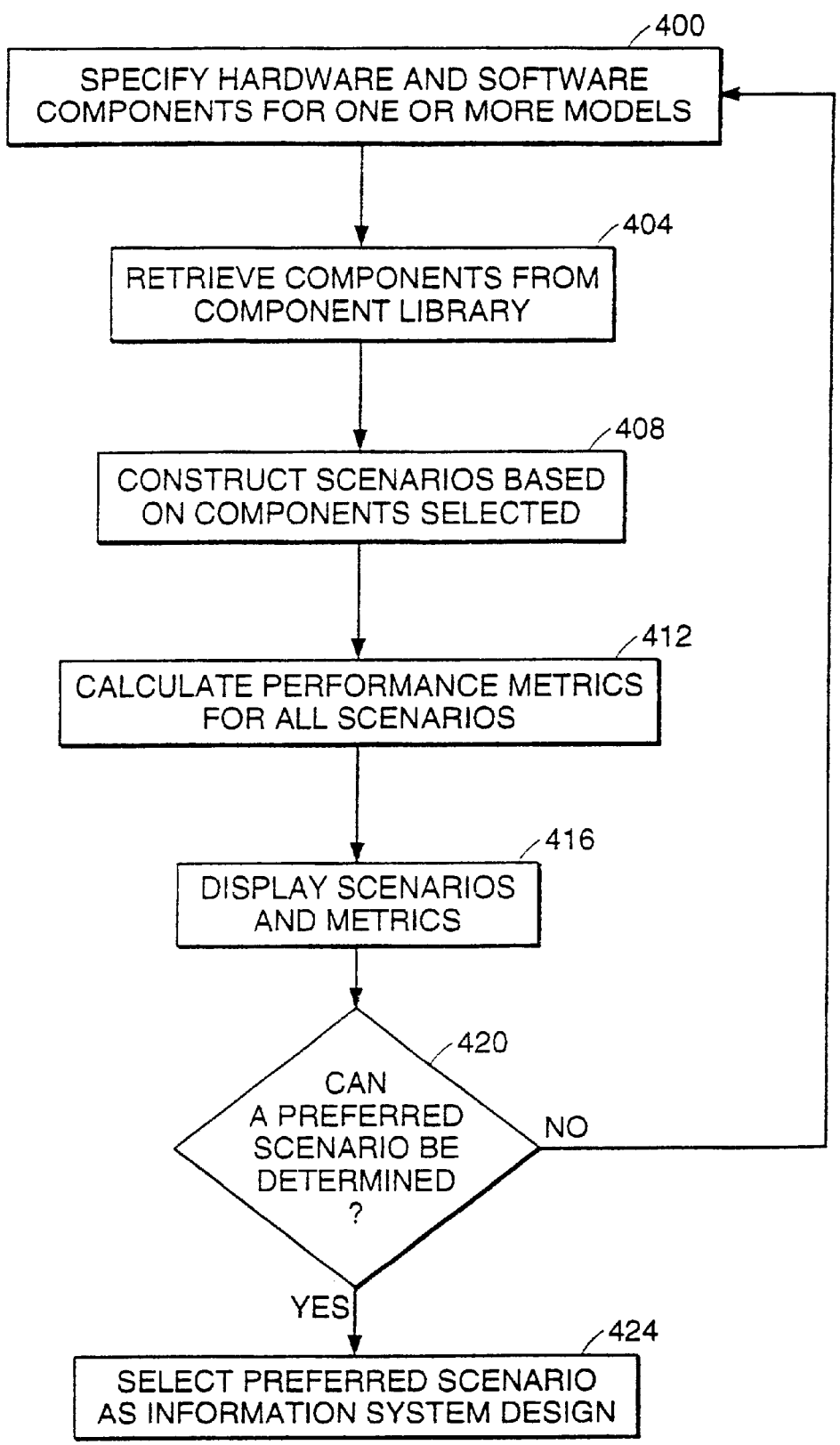
FIG. 6 depicts the process of creating additional models or scenarios for the embodiment of the invention illustrated in FIG. 3.

FIG. 2 is a flow diagram summarizing the process of information system design according to the embodiment of the invention depicted in FIG. 1 (see also FIGS. 4, 5, 6 for more detail on the design process). First, the input module 14 receives descriptive input 12 from a designer or other source (step 200). The input module 14 validates this input (described in more detail later). The input module 14 passes on the validated input to the construction module 18, which then transforms the descriptive input 12 into quantitative input (step 204). The quantitative input provides a specific representation of an information system 10 based on the descriptive input 12. The construction module 18 then constructs an initial information system model 20 based on the quantitative input (step 208). In one embodiment, the initial model 20 is based on an initial selection of hardware and software components 54, 58 (see FIG. 3), such as one or more hardware computing systems and one or more software applications, such as database applications, that implement the descriptive data. The construction module 18 then constructs additional models 22 of the information system as a basis for comparison with the initial model 20 (step 212). In one embodiment, the additional models 22 are created based on additional input provided by the designer of the information design system 10.

The performance metrics module 24 calculates performance metrics for the initial model 20 and each of the additional models 22 that have been created (step 216). These performance metrics indicate different aspects of the performance for each model 20, 22, such as the response time to complete one transaction. The output module 26 then outputs the components 54, 58 that make up each model 20, 22 and the performance characteristics of each model 20, 22 (step 220) so that the models 20, 22 can be compared. In one embodiment, the output module 26 then provides the output 28 on a computer display screen, and a designer using the information design system 10 compares the displayed output for the different models 20, 22. The designer determines whether enough models 20, 22 have been displayed so that the designer can make a selection of a preferred model. The designer makes this selection based on the performance metrics of each model 20, 22, and which hardware and software components 54, 58 make up each model 20, 22. For example, the user may have certain preferences for hardware and software components 54, 58, and thus may select a model 20, 22 with marginally lower performance metrics due to these preferences. If the designer cannot select a preferred model based on the output 28 being displayed, then the user may request that additional models 22 be created (step 224). In one embodiment, the designer selects the hardware and software components 54, 58 for the additional models 22. In another embodiment, the information design system 10 selects hardware and software components 54, 58 for the additional models 22.

The designer may also decide to change the initial descriptive input 12 provided to the system in step 200 to determine what effect this will have on the resulting models 22. If the user does not desire to change the descriptive input 12 and has a sufficient number of models 20, 22 displayed to make a comparison and reach a conclusion, then the designer selects one of the models 20, 22 as the preferred information system design (step 228).

FIG. 3 depicts a functional block diagram of an information design system 10 for one embodiment of the invention, depicting an input 12, input module 16, input validation module 30, construction module 18, performance metrics module 24, scenario module 46, component libraries 50, display module 62, and output 28. The input module 16 has been described previously in connection with FIG. 1. The input validation module 30 is a software module or hardware device that provides for validation of the input 12. The construction module includes transformation 34, construction 38, and calibration 42 submodules. The scenario module 46 works in coordination with the construction module 18 to construct additional models 22 after the initial model 20 has been constructed. The initial and additional models 20, 22 may also be termed scenarios. The construction module 18 and scenario module 46 use models of hardware components 54 and software components 58 contained in a component library 50 to construct the initial model 20 as well as additional models 22. For example, hardware components 54 can include models of different types of computer processor, such as Intel® based PC processors, such as Pentium®, Pentium® II, and other models, as well as other types of computer systems, such as UNIX®-based workstations based on non-Intel CPU's (central processing units) as well as processors for the IBM®9000, Digital Equipment Corporation's VAX™ and Alpha™, the Honeywell DPS/9000®, etc. Hardware components 54 can also include models of other components such as input/output devices, display monitors, printers, network connections, network devices, and other hardware devices. Software components 58 can include models of software programs, software applications, and software database management systems, such as Oracle® or DB2 from IBM®.

FIG. 4 depicts a flow chart of the input validation process for the embodiment of the information design system 10 illustrated in FIG. 3. The input module 16 receives descriptive input 12 (step 200). The input module 16 then passes on the descriptive input 12 to the validation module 30, which then validates the input 12 to determine if it is coherent (steps 240 and 244). The input module 16 compares the different pieces of input data 12 that have been received to determine if they form a coordinated or coherent data set. If the input data 12 is not coherent, then the validation module 30 directs the input module 16 to ask for additional input (step 252 and 200). The input module 16 may ask for additional information, more detailed information, missing data, or ask that the input data 12 be reinput. Once the data has been validated, then the input module 16 sends the validated data to the construction module 18.

FIG. 5 depicts the process of constructing a model 20, 22 for the embodiment of the invention illustrated in FIG. 3. The transformation submodule or transformer 34 of the construction module 18 transforms the validated descriptive input into quantitative data (step 300). The construction module 18 receives descriptive input 12, such as that for the number of transactions per deposit account, which is handled by a business account function such as a deposit account function. The construction module 18 relates the deposit account business function to a software application or application subcomponent for deposit accounts. One application may be designed either to handle one account or several types of accounts. The information system designer determines what function each subcomponent of an account application performs, for example, by interviewing the developers of the account application, and inputs this information as part of the descriptive input 12. The construction module 18 uses this information to map the business functions to the application subcomponents.

The transformation submodule 34 then obtains quantitative information from the component library 50 for the component models 54, 58 selected for the model (step 304). The construction module 18 uses this quantitative data. For example, the construction module 18 determines that the account application will run on a certain type of CPU and use a specific database application to access account data on a specific type of disk drive. The specific time estimates for CPU consumption are based on the information stored in the component library 50. For example, the component library 50 may have data indicating that a credit/debit transaction executed on a certain model of Hewlett-Packard workstation consumes 60 seconds of CPU time and 15 I/O accesses.

Thus the construction module 18 can estimate the relevant quantitative data, such as the amount of CPU processing time for a deposit account transaction, such as 90 seconds of CPU time used by the deposit account application subcomponent. The construction module 18 may also determine that the deposit account application uses an interest calculation subcomponent that consumes 30 seconds of CPU consumption for calculating interest for one customer transaction. From this information, the construction module 18 may determine, for example, that a deposit account transaction will require a total CPU consumption of 120 seconds CPU time and 15 I/O accesses. The 120 seconds of CPU time includes the 30 seconds of CPU time required to calculate interest, and the 90 seconds of CPU time used by the deposit account application subcomponent.

The transformation submodule 34 then completes the transformation based on the descriptive input 12 and the data obtained from the component library 50 (steps 300 and 304).

A construction submodule 38 then constructs the initial model 20 (step 308). A calibration submodule 42 then calibrates the initial model 20 determine an interval of confidence in the model 20, 22 that predicts how closely the model 20, 22 will correspond to an actual information system constructed based on the model 20, 22 (step 312). For example, for a model 20, 22 of an existing information system, the calculated values (such as time to complete a transaction) in the model 20, 22 should be within 2% of the observed values based on measurements of the existing information system. For a model 20, 22 of a newly designed information system, the calculated values in the model 20, 22 should be in the same order of magnitude as values estimated from statistical rules in the component library 50.

The calibration submodule obtains reference data or benchmarks of performance values from the component library 50 relevant to the component models 54, 58 selected (step 316) and uses this data to determine if the benchmarks match estimates for performance values calculated by the construction module for the model 20, 22 (step 312, 320). For example, a benchmark from the library indicates that a performance value for a credit/debit transaction on a certain type of computer system should take no longer than 15 milliseconds. The estimate for the performance value for the same transaction from an information system model based on a model of the same type of computer system may be significantly larger than 15 milliseconds. If the benchmark does not match the model estimates (step 320), the designer of the information system should reexamine the input data 12 and the sources for it as well as decisions about the component models 54, 58 and architecture of the model 20, 22 (step 324). If the initial assumptions and descriptive input 12 must be changed, the designer must provide new input 12 (step 328), and the input 12 must be validated (step 332, see also FIG. 4). Then the new input 12 is transformed into quantitative data (step 300).

If the transformed data is verified by calibration (step 320), then the quantitative data and model 20, 22 produced by steps 300 and 308 are sent to the performance metrics module 24 (step 336).

FIG. 6 depicts the process of creating additional models 22 or scenarios for the embodiment of the invention illustrated in FIG. 3. In one embodiment, the designer specifies hardware component models 54 and software component models 58 for an additional scenario, using a combination of hardware and software component models 54, 58 not used in the initial model 20 (step 400). The designer can specify one or more scenarios using any number of combinations based on the hardware and software component models 54, 58 available in the component library 50. These hardware and software component models 54, 58 provide sufficiently detailed information on the characteristics of each component so that accurate models 20, 22 of information systems can be constructed based on these component models 54, 58. The scenario module 46 then retrieves the selected components 54, 58 for each scenario to be created from the component library 50 (step 404). The scenario module 46 then constructs one or more scenarios 22 based on the combination of component models 54, 58 selected for each scenario (step 408). The performance metrics module 24 then calculates performance metrics for each scenario 22 (step 412). The scenario module 46 then directs the display module 62 to display the characteristics of each model 20, 22 along with its performance metrics (step 416). In one embodiment, the scenario module 46 ranks the models 20, 22 based on the performance metrics. The designer then compares the displayed models 20, 22 to determine if a particular model can be selected (step 420). If the user desires to see more or different scenarios 22, the user can then specify combinations of component models 54, 58 for additional scenarios 22 (returns to step 400). In one embodiment, the designer can ask the information design system 10 to select additional combinations of component models 54, 58 for additional scenarios, which the information design system accomplishes by an analytic approach, such as by using an artificial intelligence or expert system approach. The designer may also find that one scenario is a preferred approach, based on the performance metrics and the component models 54, 58 selected for that preferred scenario (step 424).

The designer may decide not to specify a new combination of component models 54, 58, but may instead decide to change the descriptive input 12 upon which the model 20, 22 is based, returning to step 200 in FIG. 4. For example, the descriptive input 12 includes information on business processes to be followed, including non-computer based processes reflecting a proposed descriptive architecture for the information system model 20, 22. These business processes and architecture may be changed, thus changing the descriptive input 12 and resulting models 20, 22.

Target Information System Design

The information design system 10 of the invention can be implemented in different embodiments. One such embodiment is the system offered by Gate Software LLC of Omaha, Nebr.

In one embodiment of the invention, the information design system 10 models an information system on a top/down approach. The information design system 10 models mathematically the value chain from the business management and process domain at the top level, to the application design, management, and implementation domain at the middle levels, to the system/network/hardware management domain at the bottom levels. The information design system 10 pulls descriptive input information 12 from the business management domain to the application domain and finally to the system domain, and translates the descriptive input 12 into quantitative data. By definition and design, the information design system 10 is multiplatform and distributed and allows for multitechnology solutions. Thus, action planning can profit from both the evaluation and comparison of the possible actions on different layers of the domains and different technology solutions.

The business management domain is represented in the modeling process through descriptive information for both the business process and the business function layers. These two layers represent the impact of the organization's activities on the performance of its information system.

The modeled and computed performance metrics allow evaluation of the effect of the modeled information system on the organization activity. The relational description of the business process (volume and weight of each function) should be carefully described in the descriptive input 12. The modeling paradigm links higher layer volume to lower level volume and weight. This approach is the natural way an organization evaluates its business performance. In other words, the modeling paradigm answers the question of how many customers can be served, if n customers ask for function x, and m customers ask for function y, knowing that the function x will need twice the processing time of function y etc.

In order to compute the processing time for each function, the information design system 10 requires the same type of descriptive input information 12 for the lower levels, such as the application architecture, application implementation, operating environment, and hardware/network layers. Each business function calls upon different applications that it uses differently depending on the weight each application contributes to performing the function. This approach relies on the dependence of each application on its constituent subcomponents. This approach involves two more layers in the application domain, one for transactions (based on business functions) and another layer for the application architecture.

The next layer in the application domain concerns the implementation of application components and subcomponents on servers. While each of the preceding layers contributes in the descriptive definition of the value chain, this fifth layer is the first layer providing a quantitative representation of the value chain.

The information design system 10 maps the descriptive structures collected above through the descriptive input 12 and the data structures defined in this implementation level to compute analytically the data access strategies. These access strategies are translated, in turn, through the model 20, 22, into processor times and input/output requests upon the I/O-subsystems. The implementation layer forms the liaison to the technology subsequent layers of the system management domain (which are the operating environment and networking/hardware layers, respectively). For these two layers, the descriptive input 12 includes technology components and mode of connections, and the quantitative part provides the necessary benchmarks and numbers to be used in model computation.

Any of the quantitative values could be either measured in an existing system (see FIG. 9), substituted from an estimation source (see FIG. 7), or provided by the model library 50. The difference between modeling an existing and a new system is that the accuracy of an existing system model is expected to be up to 98% accuracy, consequently providing a secured interval of confidence, and the accuracy of a new information system model is a theoretical accuracy corresponding to assumptions approaching incrementally a robust definition of a target system 70 (as shown in FIG. 7).

Figure 7:
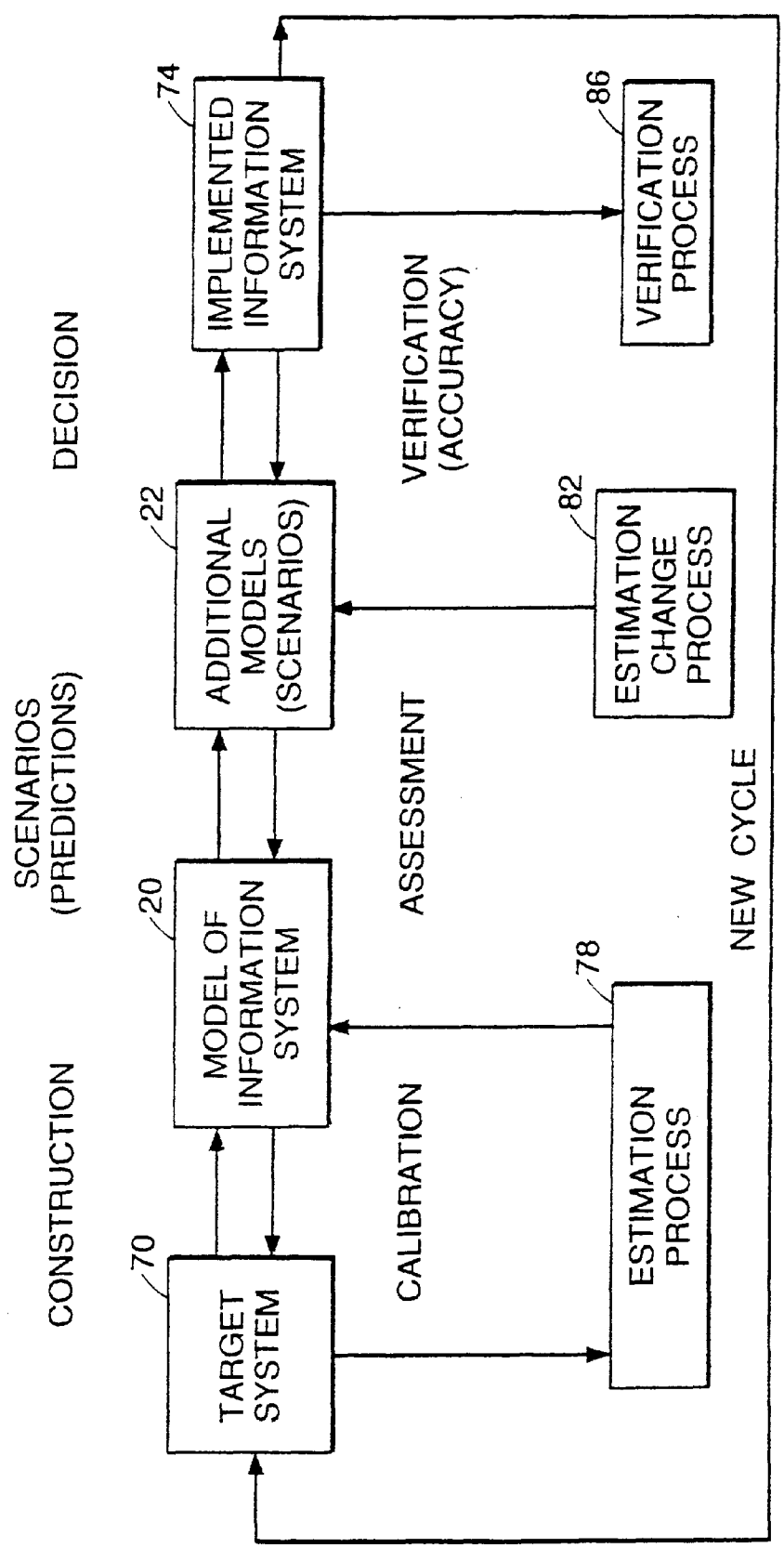
FIG. 7 illustrates a functional block diagram for an embodiment of the invention illustrating a target system, an initial model of the target system, additional models, and an implemented information system.

FIG. 7 illustrates a functional block diagram for one embodiment of an information design system 10 based on the above approach, illustrating a target system 70, an initial model 20 of the information system, additional models or scenarios 22, and an implemented information system 74. The target system 70 is a proposed information system design and architecture to be modeled. Estimates of the characteristics of the proposed information design system are done by an estimation process 78 that also determines hardware and software components to be used in the initial model 20 based on component models 54, 58 selected from the component library 50. In one embodiment, an information system designer makes the estimates. In another embodiment, the information design software makes the estimates based on input 12 provided by the designer and information obtained from the component library 50.

As an example, the information design system 10 needs information about database tables size and order structures for a model 20, 22 to derive the cache hit ratio. The database information and the cache hit ratio are used together to compute the contribution in processor consumption and the number of physical input/output. On the other hand, the computed value of the total processor utilization will be compared with the measured value of the processor busy time divided by the observation time (see the performance metrics discussed in more detail below).

As previously mentioned, the information design system 10 requires input data of two types: descriptive information and quantitative information. The information design system 10 splits the later into two classes of data sets: One data set concerns the data that will satisfy the parameters of the methods used to compute the performance metrics. The other data set is used by the calibration process to determine the computation accuracy of the model 20, 22.

The required data is largely the same whether modeling a new application that is still in an early phase of the system development life cycle or for an existing application in operation. The only difference, from a data collection point-of-view, is the origin of data. For the application in development, estimations are used to provide the input data 12. The estimations will be gathered from the project information, from unit/calibration testing or experiments, and/or from the library 50 which provides any missing model parameters. Using the library 50, the information design system 10 can model a new application before starting the implementation process and aid the designer in choosing a preferred information system design before implementation.

The initial model 20 is then calibrated by comparing estimates obtained from the model 20 against information and benchmarks contained in the component library 50, and, if necessary, the estimation process 78 is repeated (see the previous discussion on the calibration process for FIG. 5).

In one embodiment of the invention, this calibration process is accomplished through three steps as described in the following:

The first step is a walk through in which each assumption used in the model construction is validated.

The second step consists of comparing the computed values of the model 20, 22 without any distinction of the mode of operation in each class of users (Batch, Transactional, Real Time) to the measured values. Usually, through a fully automated iterative process, the information design system 10 is able to provide very acceptable accuracy for the computed model 20, 22.

The third step consists of moving different classes of applications, each in its mode of operation category, to the appropriate place in the model structure. Typically, computation results obtained are in agreement with those obtained in the second step, but this is not always the case. In many cases the model 20, 22 computed in this step is theoretically a best or ideal case of the reality and any deviation should be diagnosed. The results of the model 20, 22 show either an agreement or a faster response. If the results are a faster response, these results are an indication of non-modeled phenomenon, non-captured events or workload independent overhead.

After the initial model 20 is calibrated, additional models 22 are then constructed in an assessment and prediction process, calibrated and evaluated based on their performance. This process may lead to changes in the assumptions and estimates in an estimation change process 82 made for the proposed information system (see also FIG. 5). A preferred model selected from the initial model 20 and additional models 22 is then implemented as an actual information system 74. The performance of the actual information system 74 is compared with the predicted performance of the preferred model in a verification process 86. If the performance is not what is expected, then the whole process may return to the initial steps of designing an architecture for a target system 70 and a new round of estimates using the estimation process 78.

In one embodiment, the descriptive input 12 includes the information requirements for the target system 70, including an architectural description of the business application or proposed business information system. This description includes the business and service requirements, including a qualitative description of the business volume and service measures. For example, the business volume includes such measures as the number of debit/credit transactions, the number of trades (such as matched orders in a stock exchange), and/or number of bills. An example of a service measure is the number of transactions per second.

The descriptive input 12 also includes a description of the business functions. A business function is a high-level function that may or may not correspond to computer program or software application; that is, the business function may include noncomputer activities and transactions as well as computerized or software activities or applications. Examples of business functions include order matching (as at a stock exchange), production management, billing, and booking functions. Several business functions may be part of a larger business process. For example, a business process for managing bank customers may include business functions for handling current accounts, mortgages, revolving accounts, deposit accounts, equity accounts, etc.

As part of the descriptive input 12, the primary application subcomponents must be identified for each of these business functions. For example, a business function for order matching may include order identification, order processing, sorting and matching (sell & buy transactions), updating, and/or notification components or subcomponents. Some of these subcomponents are manual or noncomputerized activities. Other subeomponents are computerized and are matched up to a software application or subcomponent of a software application.

The descriptive input 12 includes a general description of the data management in the proposed information system. For example, the input 12 may include the type of file, such as a flat data file, or a database structured file, such as a relational database structure.

The descriptive input 12 also includes an identification of critical business processes in peak periods. The critical business processes can include the activity characteristics of the business processes, the functions involved, and the subprocesses involved.

With regard to networks, the descriptive input 12 includes a description of the network traffic, including the size and frequency of messages. Typically, the proposed information system is for a client/server based system, meaning that client computers and server computers are connected in a network. Typically, the client computers handle the input and output of the data, as well as some limited processing of data, and the server computations handle most of the processing of the data and accesses to databases, which are typically on hard disk drives. In one embodiment, the input to the information system is a batch file obtained from a data storage device.

The input 12 must include any details that are considered pertinent to the understanding of the business application or process.

The descriptive input 12 also includes estimates determined by an estimation process 78. In one embodiment, a designer of the information system makes these estimates and enters them into a user interface provided by the input module 16 of the information design system 10. In another embodiment, the information design system 10 provides an analytic or expert system module which makes these estimates based on the input 12 and information obtained from the component libraries 50.

One set of estimates is for business volume and growth rate. For example, these estimates include the number of transactions per business process, the weight of transaction type per business process, and the growth in business volume per year. The growth in business volume per year is included to make determinations later about whether the proposed information design system can handle a growth in volume readily (see the discussion of the aging ratio provided later).

The estimates also identify the system profile for each process or transaction. The system profile is classified as: weak, medium or heavy. There should also be an estimate for each type of profile. The system profile is described as CPU time required to complete each process and the number of I/O transactions with a storage device, such as a hard disk. The time estimations (CPU, in milliseconds) should be related to a specific hardware computer system. In one embodiment, the system profile is determined by multiplying the number of transactions of a certain class per second by the consumption per transaction. If this value is less than 1%, then the system profile is classified as weak. If this value is between 1% and 10%, then the profile is classified as medium. If this value is between 10% and 50% then the profile is classified as heavy. These percentages are based on a percentage of total consumption.

If the process is formed of several physical transactions separated by user intervention (up to 30 seconds), the designer should provide an estimate of the proportion of the access time made by one transaction which has been shared by the preceding transaction.

If the proposed information system design is expected to use a relational database, the estimator must provide detailed information on the database. Information that should be provided includes the size (number of rows and columns) of the main tables (the most accessed tables). (Typically, this information is required for the approximately 20 tables that generate 80% of the accesses in a typical information system.)

Other information to be provided includes identification of the cache memory for each of the main tables (in case of several cache memories), number of indices and size, and physical size of the main tables and disks.

For each access, the estimate must distinguish between access to data and access to indices. For each data access, the estimate must indicate whether the access is through an index or not. The estimate must also indicate whether the estimate is a single access or group access. A group access occurs when the access must go through multiple indices in order to insert or extract data from a database. For example, if the transaction is to insert addresses for all people whose last name ends in "C" in a database, then the insert is done through a table and there are accesses to multiple indices for all the people whose name ends in "C". For the group access, the estimate must classify the access by category, give the global volume used, and give the algorithm for replacement of pages in the cache memory.

The descriptive input 12 must also provide a description of the modeling objectives for the proposed information system design. The modeling objectives are relevant to the process of modeling additional models 22 based on changes to the estimates or assumptions 82. The input 12 thus includes data required in order to determine the applications components and subcomponents that need to be modeled and the level of details in order to allow for examining and managing the changes. The input 12 should also define the type of scenarios or additional models 22 to be created in comparison to the initial model 20. This includes, for example, changes to the access mechanism or changes in attributes of application subcomponents.

The solution to a modeling problem starts generally by computing the physical I/O and processor consumption of the data structures. These last will be injected to the higher layer solvers. In addition, the information design system 10 computes validation values that are used to verify whether the convergence is obtained with previously obtained measurements or estimates, or whether it should iterate the computation for a better solution. Typically, two successive values of the validation parameters (generally the throughput) indicate the degree of accuracy of the solution. If the difference is still significant, a new iteration will be initiated in which the non-captured ratios will be re-distributed before a new computation is processed. Two mathematical advantages with this approach are the following: accuracy is obtained whatever the initial conditions will be (error with inconsistent input information), and the accuracy magnitude of the solution is provided to build confidence in the recommendation of a preferred information system reached by using the information design system 10.

The library 50 of pre-modeled components 54, 58 allows the information design system 10 to model a new information system prior to its design. It is also able to conduct the performance and availability evaluations of the target system 70 prior to each phase of the development life cycle. It allows the evaluation of the implementation options and the best optimal architecture for a distributed system. All pre-modeled components 54, 58 are either mathematical models of a complex technology (relational databases or complex controllers) or results of previously determined benchmarks characterized by a high level of reproducibility. The designer can add her own library that might contain partial or entire information system models 20, 22 as well as customized components extending the information design system library 50, as desired.

Performance Metrics

After the construction module 18 constructs the initial model 20 and additional models 22, the performance metrics module 24 constructs performance metrics for each model 20, 22 (see FIG. 6).

In one embodiment, the sets of metrics are provided globally (the information system as the business support) as well as on the component level (logical and physical).

An internal process within the information design system 10 allows the validation of all computed metrics in terms of accuracy and consistency among them. This process verifies among others that any basic quantity constituent to a metric is accounted for once and that this quantity is coherent with the others (for example, the processor utilization is computed several times from a variety of constituents, and the different results obtained for the processor utilization should show the same value). These constituents are computed mathematically on different layers generated by the decomposition.

For each layer of the model 20, 22 and domain, the metrics are provided using the definitions of the domains and layer state of practice. For example, the business transaction response time is different from the application transaction response time, because the business transaction response time also includes a business process delay (see the discussion of performance metrics below). For each layer there is a result screen that helps the concerned designer appreciate the metrics in using her own metrics conventions.

The performance metrics include the following: basic service time, response time, percent utilization (or utilization), throughput, queue length, percentage elongation (or elongation), aging ratio, ceiling, efficiency curve, number of logical I/O, cache hit ratio, business response, efficiency ratio, degradation ratio, process delays, degree of parallelism, and non-productive ratio. These metrics are discussed in detail below.

The basic service time is the time spent to complete a task without waiting on resources, such as CPU resources that may be utilized by other tasks. Also referred to as "pure time" or "unloaded time" for a task.

Response time is the time spent to complete a transaction including any waiting time. The response time is also defined as the "elapsed time" between task initiation and task completion for measuring tasks on an existing information system. The response time can also be termed the "refresh time". For example, the refresh time is the time for a software application to complete a transaction or for the application to be refreshed. In one example, using the process described in FIG. 6, the response or refresh time for an application in a model 22 of a proposed information system was reduced from greater than 19 seconds to 2.32 seconds.

For a model 20,22 of a newly designed information system, the response time for a task or transaction is computed from the response time constituents on the transaction path. Each response time constituent contributes a part of the response time based on how much time it takes for the constituent to perform its part of the transaction. The response time also includes any waiting time due to conflicts, contentions, and delay. The response time constituents include all components 54, 58, applications, and subcomponents that are on the path that the task follows in the model 20,22 to complete the transaction. The response time constituents are also defined as including all constituents or entities on the transaction path, whether based in hardware or software. The constituents also may be modeled in terms of logical or physical entities.

The percent utilization, utilization rate, or utilization is the amount of resources that are consumed (such as CPU time) by a particular task or group divided by the total consumption. A group is created when several business functions, or application subcomponents, are logically related to each other and are grouped together, as in a collection of similar or compatible transactions for one business function.

Utilization is also defined as the consumption (of a task) divided by the period of observation. For example, the utilization of a gateway node in a network can be measured for a given period of observation. For example, a utilization of 0.5 indicates that the node is being utilized at a 50% rate.

The throughput indicates the number of units per work accomplished per second by the model 20, 22 of the information design system.

The queue length is the number of events (requests or transactions) waiting to be serviced by the information system model 20, 22.

The percentage elongation, elongation factor, elongation, or residence factor is the ratio between the actual average response time of a task and what the response time would be if the task is executed alone in the system without any resource contention. In other words, the residence or elongation factor is the normalized response time with respect to the execution time without wait. The elongation factor is calculated by:

((1−response time)/basic service time)*100

The elongation factor is useful in determining components, such as application subcomponents, that are performance sensitive and can cause a degradation in efficiency of the information system model 20, 22. This inefficiency may be caused by applications or application subcomponents that cause delays or locks in the system. The information system designer can consider replacing the offending application causing the excessive elongation (high value for the elongation factor) with an alternate application selected from the components 54, 58 in the component library 50 and creating additional models 22 based on the alternate component (see FIG. 6).

The aging ratio reflects a decrease in efficiency of an information system over a period of time. The aging ratio is calculated as (total system consumption at t2−total system consumption at t1) divided by (t2−t1)

where t1 indicates a first point in time and t2 represents another point in time after the first point in time. Typically the difference between t2 and t1 is one year, and the aging ratio reflects an estimate of an annual aging rate for the system.

The aging ratio may be estimated for a newly designed information system model 20, 22 or for an already existing information system. For an existing or a new system, the aging ratio is used to determine or predict when the system will become inefficient due to aging effects on the information system. The aging effect appears mainly in the form of elongation to the response time, and/or total batch interval, for a constant throughput after a period of time. System aging indicates an incremental loss in efficiency limits over time. It may also increase with an accelerating speed as time goes by. Application aging becomes therefore a key indicator that reflects unnecessary application complexity.

In other words, the processing speed for the same number of transactions or batch workload gets slower over time. As an example, a branch office system for a bank may not be able to process all of its business workload in a timely manner after a certain period even if the workload has not been increased.

The main reasons that cause application aging could be summarized as follows:

Application maintenance of all kinds unless the maintenance specifically aims at performance improvement Functional changes in the application environment: such as new applications, merging or splitting application functions, porting application, . . . etc.

Continuous addition of functionality, application components and/or technology solution in a client/server architecture, Natural aging of application and system components: operating environment, data bases, communication components, . . . etc.

Most modern information systems are initially well-designed with a clean and well thought-out architecture. Over time, more applications and extra functionality are piled up on top of the same architecture. The continuous piling of applications adds complexity to the initial clean architecture. It becomes, then, more difficult to track down the applications and/or application subcomponents that cause unnecessary complexity.

The information system model 20, 22 is used to predict the performance indicators that correspond to a real-life calibrated information system. When done periodically, the performance indicators help predict the aging effect at any point in time in the future through extrapolation techniques.

To illustrate the efficiency decay due to aging effect, one example is the case of one of the major European Stock Exchanges. In the mid 80's, the stock exchange has gone in operation with a new continuous quotation system with a maximum capacity of 150,000 transactions per day. Ten years later, the maximum capacity of the system became only 80,000.

The ceiling performance metric indicates the maximum throughput of an information design system model 20, 22.

Figure 8:
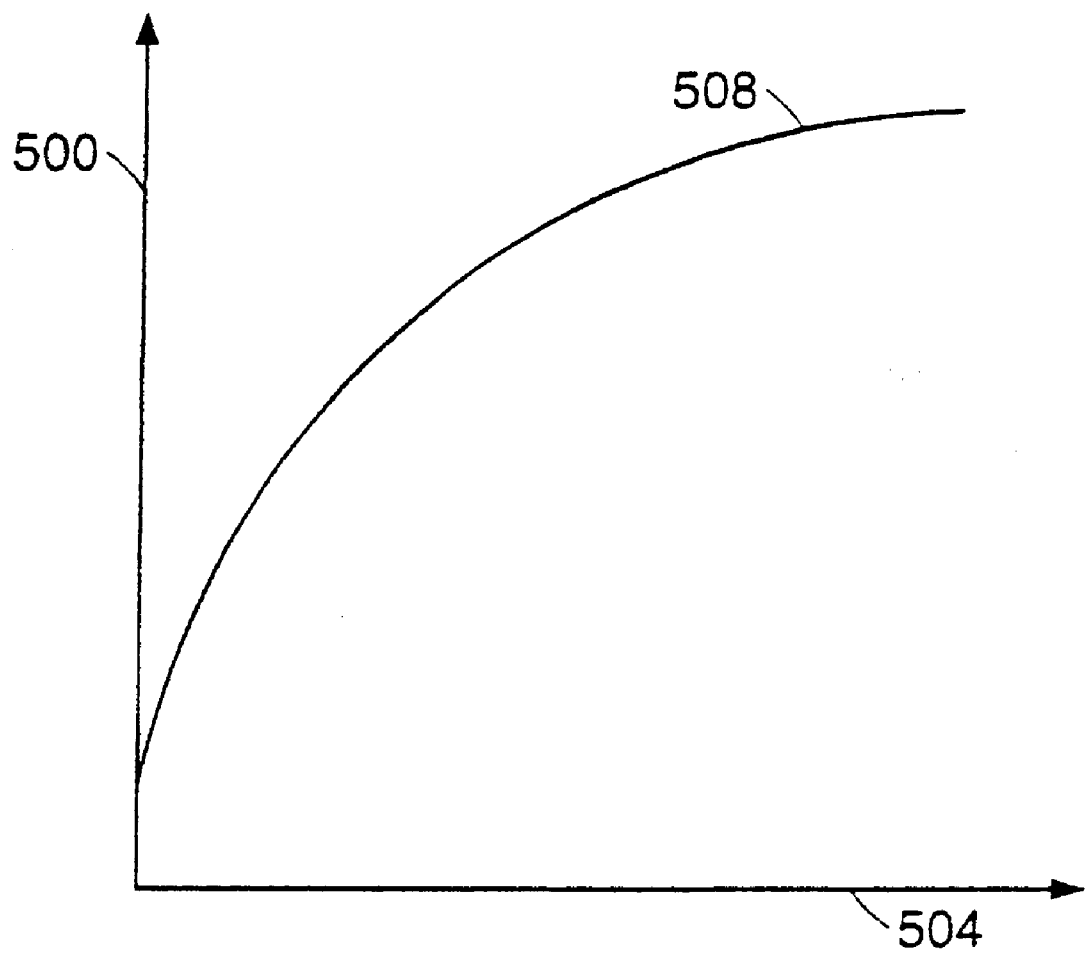
FIG. 8 depicts an efficiency curve graph for the embodiment of the invention illustrated in FIG. 7.

The efficiency curve graph 508 is illustrated in FIG. 8 and is a based on a ratio of the activity level or workload 500 (vertical axis) to the response time 504 (horizontal axis). In an alternate embodiment, the efficiency curve is displayed with response time as the vertical axis and activity level as the horizontal axis. The activity level may be represented by a number of transactions or number of customers. The efficiency curve 508 may be calculated for individual applications subcomponents in the information design model 20, 22 or other levels or components 54, 58 of the model 20, 22. As the level of activity increases, the response time 504 initially increases at a nearly linear rate. However, as the level of activity increases further, the response time 504 increases more rapidly, indicating increasing inefficiency in the application. This point where the curve 508 ceases to follow a substantially linear relationship and the response starts becoming unacceptable may be referred to as an "elbow" in the curve.

The number of logical I/O performance metric is an estimation of the input/output events for an information system model 20, 22. The logical I/O is computed and compared with the physical I/O and could be equal to or larger than the physical I/O. A physical I/O occurs when an actual access occurs to data stored on a storage device, such as a hard disk drive. A logical I/O occurs when data is retrieved from either a cache in memory or from a data storage device. If the data is not available in a cache, then the logical I/O is transformed, in effect, to a physical I/O to retrieve the data from a storage device.

The cache hit ratio metric is the ratio of the number of I/O cache hits to the total I/O.

The business response or process time metric is the computer processing time plus the noncomputer time involved in a process. For example, to process a letter by the computer may take 2 seconds of CPU time, but the time to print out, manually package, and deliver the letter by airplane takes 15 hours. The total response time is 15 hours and 2 seconds.

The efficiency ratio is the workload dependent consumption divided by the total consumption. The workload dependent consumption changes with the amount of activity in the information system model 20, 22 and increases if there are more customers and transactions involved in the model 20, 22. The total consumption includes the workload dependent consumption and consumption that does not vary with increasing workload, also referred to as overhead. For example, if 10% of the workload varies with the number of customers, and 90% of the consumption is overhead, then the efficiency ratio is 0.10 (also expressed as 10%). The efficiency ratio is typically calculated based on workload dependent consumption in milliseconds of CPU time divided by total consumption in milliseconds of CPU time.

The degradation ratio is the CPU time for one I/O access divided by one I/O or the CPU time for n I/O accesses divided by n. For example, if the CPU time for one I/O access is 15 ms, then the degradation ratio is 15. Typically, if the degradation ratio is larger than 15, then the application component that is being computed by the model 20, 22 is not efficient. For a newly designed information system model 20, 22 the degradation ratios determined by the model 20, 22 can be compared to degradation ratios stored as benchmarks in the component library 50.

The process delay or business process delay metric is the waiting time that occurs due to processes outside of the computer system. For example, if a document must be physically delivered in hard copy, as by an airplane, the transit time of the trip is a process delay.

The degree of parallelism metric is the number of parallel instances of an event that can be processed at the same time. More events can be processed in parallel if more resources, such as additional servers and/or additional copies of a software application, can be added to the system. This can be done by specifying additional hardware component models 54 for a information system model 20, 22. But adding additional resources may not result in an additional linear increase in throughput. For example, if a bank has a capacity to handle 5 million customers using a banking software application, adding another copy of the application would typically result in a total capacity for 9 million customers. Adding still another copy of the application would typically result in a total capacity for 12 million customers.

The non-productive ratio is defined as workload independent consumption divided by total consumption.

The workload independent consumption metric is the consumption (CPU time) that is independent of the number of customers divided by total consumption. If this ratio is close to 1, then the information system model 20, 22 is not efficient.

Real Information System Re-engineering

Figure 9:
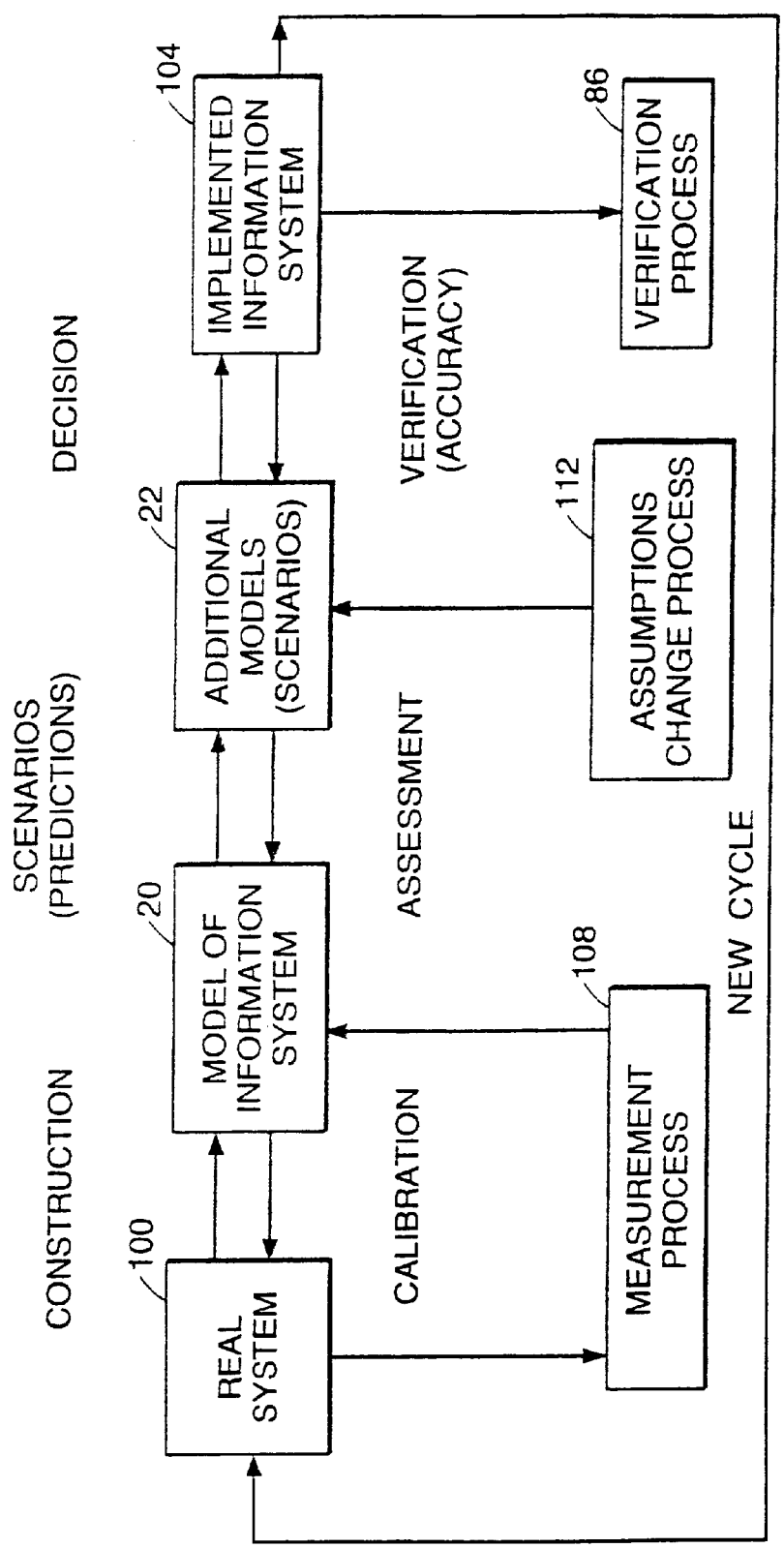
FIG. 9 illustrates a functional block diagram for an embodiment of the invention illustrating a real system, an initial model, additional models, and an implemented information system.

In one embodiment, the system of the invention 10 is used to redesign or re-engineer an existing information system 100. FIG. 9 illustrates a functional block diagram for such an embodiment of an information design system 10, illustrating an existing real system 100, an initial model of the information system 20, additional models or scenarios 22, and an implemented information system 104. The real system 100 is an existing, functioning information system in an organization that is being examined, either for diagnostic purposes or to re-engineer the information system 100. Measurements of the characteristics of the real system 100 are done by a measurement process 108 that measures actual characteristics and performance of the real system 100.

For an existing application, in addition to the information entered through the model's input interface, the quantitative data is collected using the following steps:

The vendor, who is collecting the data, monitors and collects the operational data for the real system 100 using a specification form in which a precise definition of observation window, data parameters, operational and physical characteristics, configuration and topology, are specified.

In one embodiment, the collected data is introduced into the modeling tool, and the transformer 34 supervises the modeling process until the models 20, 22 are constructed and validated. The transformer 34 extracts the model input parameter information from the collected data, verifies its completeness, and validates its consistency. Practically, the transformer 34 uses a set of rules to validate that the collected data representing all observed events from different resources are numerically consistent. For instance, any difference may indicate that a sampling discipline in the vendor monitor did not work properly. Once the transformer 34 performs checks for completeness (all necessary parameters are available) and consistency (all events are recorded), the information design system constructs an initial model 20 (using the descriptive information introduced through the model interface as well as the parameters delivered by the transformer 34).

The initial model 20 is then calibrated against the measurements of the real system 100 (see also the previous discussion on the calibration process for FIG. 5).

In one embodiment, the model calibration step is entirely automatic with comprehensive reporting to the designer to provide confidence in the model 20 and to allow the appreciation of accuracy. In this step, the results of computation of the first non-verified model 20 will be compared to the observed metrics. Any difference can be either attributed to improper distribution of non-captured consumption or because of a major phenomenon that was not captured or represented in the model 20. The transformer 34 performs a number of iterations in distributing differently the non-captured consumption and computes the model 20 until there is convergence between the model computed metrics and the observed ones. In most cases the model 20 is able to match the observed metrics acceptably (within 98% of the observed values).

In some cases the model 20 does not match the observed metrics, either because there is corrupted data or an outstanding non-captured phenomenon. For the case of corrupted data, the transformer 34 constructs a few consecutive models 20, 22 from the outset and recommends the ones that have the best fit to the operational conditions. For the case of non-captured phenomenon, the diagnostic process starts immediately, and the information design system uses the models 20, 22 to guide the designer to identify the origin of a problem.

In one embodiment, all the above steps are performed automatically by the information design system 10. The only effort required is to define adequately the windows of observation and allow for multiple intervals to be modeled. Adequate windows means that the windows are representative of the characteristics to be modeled, such as peak intervals, or business critical and/or system critical paths or components.

Additional models 22 are then constructed in an assessment and prediction process, and evaluated based on their performance. This process may lead to changes in characteristics and assumptions of the real system 100, including proposing new or changed hardware or software components based on component models 54, 58 from the component library 50 (see also FIG. 6). A preferred model selected from the initial model 20 and additional models 22 is then implemented as an actual information system 104 implemented as a change to the existing real system 100. The performance of the actual information system 104 is compared with the predicted performance of the preferred model in a verification process 86. If the performance is not what is expected, then the whole process may return to the initial steps of designing new additional models 22 based on the implemented information system 104 which now is treated as the real system 100 to be further re-engineered.

The descriptive input 12 required for the diagnostic or re-engineering process shown in FIG. 9 is similar to the descriptive input 12 required for designing a new information system, as described in connection with FIG. 7.

In addition, the input 12 should include the distribution of applications or application subcomponents on computer servers (in a network of clients computers and server computers), data distribution on servers, network topology and protocols and network traffic (size and frequency of messages). The input 12 should also include the description and measurements of relations between business transactions and functions, business functions and application subcomponents, and application subcomponents and system transactions.

For the network of the real system 100, the input 12 should identify the parameters of the network components, such as the capacities of the network interface boards (kbps), the capacities of leased lines (kbps), and the characteristics of the routers (such as number of packets per second priorities, and compression).

For the hardware configuration of the real system 100, the input 12 should describe the computer servers, including server types, links between them, and partition mechanisms. The input 12 should include data on the disk subsystems, such as channels, controllers, strings, devices, types, and physical characteristics. The input 12 should also describe characteristics of the computer memory, such as hierarchy, service discipline, and other characteristics. The input 12 should also describe the relationship between application subcomponents and job names or process names in order to create application groups.

For relational databases, the input 12 should provide the same types of information as described for designing a new information system 70 in connection with FIG. 7.

Network measurements should describe the following attributes from source to destination in a time-window interval, for each software application traffic flow: total number of transmitted bytes, total number of messages, total number of terminals, total number of logged-in-users, total number of active users, and message frequency and size per business function.

Generally, the measurements should be done at different nodes of the network in order to verify that the measurements are consistent.

The computer service measurements should include CPU time per job (batch) or process (transaction), elapsed time per job or process, starting date per job or process, priority class per job or process, and number of I/O per job or process (and per disk device if possible). Disk subsystem measurements should include number of I/O per disk, average number of bytes per I/O, and average seek time per I/O. Measurements should also be made of the cache memory activity, including cache description, read hit ratio, write hit ratio, and read/write ratio. To calibrate and validate the initial model 20, network, server, and disk measurements should be made. The network measurements should include the utilization rate of the LANs and leased lines, and response time per application's message, from source to destination, and back, for each application flow, per time interval. The server measurements should include the total CPU utilization per time interval, and the CPU utilization per job or process per time interval. The disk measurements should include the busy rate per disk and per time interval and average response time per I/O.

Having described the preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. An apparatus for designing an information system, said apparatus comprising:

an input module for receiving descriptive input of a target information system, said descriptive input including descriptions of business processes and business functions;

a construction module for receiving said descriptive input from said input module, said construction module (i) deriving quantitative input from said descriptive input, said quantitative input including number and kind of hardware and software components for said target information system, (ii) designing an initial multi-layer mathematical model of said target information system based on said quantitative input, said layers of said mathematical model comprising a business layer, an application layer, and a system/network layer, said business layer generating data for said application layer and said system/network layer, said application layer responsive to said generated data presenting service requests to said system/network layer, said system/network layer responsive to said generated data and said service requests generating processing and servicing data, said processing and servicing data of said system/network layer factored into said business layer and said application layer, and (iii) designing at least one additional multi-layer mathematical model from said quantitative input, said multi-layer mathematical models being designed prior to implementation of said target information system;

a performance metrics module for evaluating said designed initial model and said at least one additional model, said performance metrics module calculating performance metrics for said designed initial model and said at least one additional model at each layer; and an output module for outputting said designed initial model, said at least one additional model, and said performance metrics.

2. An apparatus as in claim 1, wherein said input module derives validated input from said descriptive input and said construction module derives said quantitative input from said validated input.

3. An apparatus as in claim 1, wherein said output module provides a comparison of said initial model and said at least one additional model based on said performance metrics and a designer of said information model selects one of said initial model and said at least one additional model as a preferred information system design based on said comparison.

4. An apparatus as in claim 1, further comprising:

a library comprising hardware component models and software component models adapted for use in said initial model and said at least one additional model, wherein said construction module uses at least one component model selected from said hardware component models and said software component models when creating one of said initial model and said at least one additional model.

5. An apparatus as in claim 4, comprising
estimates of performance values calculated by said construction module for a selected model selected from said initial model and said at least one additional model; and
said library comprising benchmarks of performance values for said hardware component models and said software component models,
wherein said construction module calibrates said selected model by comparing said estimates with said benchmarks.

6. An apparatus as in claim 1, comprising:
a task comprising response time constituents on a transaction path in a selected model selected from said initial model and said at least one additional model;
wherein said performance metrics comprise:
a response time for said task computed using said response time constituents;
a basic service time determined by time spent if said task is processed without waiting for access to software or hardware resources; and
an elongation factor for said task determined by obtaining a result by subtracting said response time from 1, dividing said result by said basic service time, and multiplying by 100.

7. An apparatus as in claim 1, wherein said performance metrics comprise:
a first total system consumption measured at a first time for a selected model selected from said initial model and said at least one additional model;
a second total system consumption measured at a second time for said selected model; and
an aging ratio determined by obtaining a first result by subtracting said first total system consumption from said second total system consumption, obtaining a second result by subtracting said first time from said second time, and dividing said first result by said second result.

8. An apparatus as in claim 1, comprising:
a task comprising response time constituents on a transaction path in a selected model selected from said initial model and said at least one additional model;
wherein said performance metrics comprise:
a response time for said task computed using said response time constituents;
an activity level metric indicating a number of transactions occurring for said selected model; and
an efficiency curve graph for said selected model determined by comparing changes in said response time to changes in said activity level metric.

9. An apparatus as in claim 1 wherein said performance metrics comprise:
a workload dependent consumption for a selected model selected from said initial model and said at least one additional model;
a total consumption for said selected model; and
an efficiency ratio determined by dividing said workload dependent consumption by said total consumption.

10. An apparatus as in claim 1 wherein said performance metrics comprise:
a processing time for completing a number of input/output transactions for a selected model selected from said initial model and said at least one additional model; and
a degradation ratio for said selected model determined by dividing said processing time by said number of input/output transactions.

11. An apparatus as in claim 1 wherein at least one of said performance metrics is determined for a selected one of said initial model, said at least one additional model, a part of said initial model, and a part of said at least one additional model.

12. An apparatus for designing a computer-based information system, said apparatus comprising:
an input module for receiving descriptive input of a target information system, said descriptive input including descriptions of business processes and business functions, said input module deriving validated input from said descriptive input;
a construction module for receiving said validated input from said input module, said construction module (i) deriving quantitative input from said validated input, said quantitative input including number and kind of hardware and software components for said target information system, (ii) designing an initial multi-layer mathematical model of said target information system based on said quantitative input, said layers of said mathematical model comprising a business layer, an application layer, and a system/network layer, said business layer generating data for said application layer and said system/network layer, said application layer responsive to said generated data presenting service requests to said system/network layer, said system/network layer responsive to said generated data and said service requests generating processing and servicing data, said processing and servicing data of said system/network layer factored into said business layer and said application layer, and (iii) designing at least one additional multi-layer mathematical model from said quantitative input, said multi-layer mathematical models being designed prior to implementation of said target information system;
a performance metrics module for evaluating said designed initial model and said at least one additional model, said performance metrics module calculating performance metrics for said designed initial model and said at least one additional model at each layer;
an output module for outputting said designed initial model, said at least one additional model, and said performance metrics to a designer, said output module providing a comparison of said designed initial model and said at least one additional model based on said performance metrics to allow said designer to select one of said designed initial model and said at least one additional model as a preferred information system design by comparing said performance metrics.

13. A method for designing an information system, comprising:
receiving descriptive input of a target information system, said descriptive input including descriptions of business processes and business functions;
transforming said descriptive input into quantitative input said quantitative input including number and kind of hardware and software components for said target information system;
designing and constructing an initial multi-layer mathematical model of said information system based on said quantitative input, said layers of said initial model comprising a business layer, an application layer, and a system/network layer said business layer generating data for said application layer and said system/network layer, said application layer responsive to said generated data presenting service requests to said system/network layer, said system/network layer responsive to said generated data and said service requests generating processing and servicing data, said processing and servicing data of said system/network layer factored into said business layer and said application layer, said initial model being designed prior to implementation of said target information system;

designing at least one additional multi-layer mathematical model from said quantitative input, said additional model being designed prior to implementation of said target information system;

calculating performance metrics for said initial model and said at least one additional model at each layer; and providing said initial model, said at least one additional model, and said performance metrics as output.

14. A method as in claim 13, wherein the transforming step further comprises:

validating said descriptive input to produce validated input; and transforming said validated input into quantitative input.

15. A method as in claim 13, further comprising:

comparing said performance metrics for said initial model and said at least one additional model; and selecting one of said initial model and said at least one additional model as a preferred information system design responsive to said comparing step.

16. A method as in claim 13, further comprising:

providing a library of hardware component models and software component models adapted for use in said steps of constructing said initial model and creating said at least one additional model; and selecting a first component model and selecting a second component model from said hardware component models and said software component models, wherein said constructing said initial model step further comprises constructing said initial model responsive to said selecting said first component model and said creating said at least one additional model step further comprises creating said at least one additional model responsive to said selecting said second component model.

17. A method as in claim 16, comprising:

determining estimates of performance values for a selected model selected from said initial model and said at least one additional model; and calibrating said selected model by comparing said estimates to benchmarks from said library.

18. A method as in claim 13, wherein said step of calculating said performance metrics comprises:

computing a response time for a task using response time constituents on a transaction path for said task in a selected model selected from said initial model and said at least one additional model;

determining a basic service time as time spent if said task is processed without waiting for access to software or hardware resources; and determining an elongation factor for said task by obtaining a result by subtracting said response time from 1, dividing said result by said basic service time, and multiplying by 100.

19. A method as in claim 13, wherein said step of calculating said performance metrics comprises determining an aging ratio by obtaining a first result by subtracting a first total system consumption measured at a first time from a second total system consumption measured at a second time, obtaining a second result by subtracting said first time from said second time, and dividing said first result by said second result.

20. A method as in claim 13, wherein said step of calculating said performance metrics comprises:

computing a response time for a task using response time constituents on a transaction path for said task in a selected model selected from said initial model and said at least one additional model;

determining an activity level indicating a number of transactions occurring for said selected model; and determining an efficiency curve graph by comparing changes in said response time to changes in said activity level.

21. A method as in claim 13, wherein said step of calculating said performance metrics comprises:

determining a workload dependent consumption for a selected model selected from said initial model and said at least one additional model;

determining a total consumption for said selected model; and determining an efficiency ratio by dividing said workload dependent consumption by said total consumption.

22. A method as in claim 13 wherein said step of calculating said performance metrics comprises:

determining a processing time for completing a number of input/output transactions for a selected model selected from said initial model and said at least one additional model; and determining a degradation ratio for said selected model by dividing a processing time for completing a number of input/output transactions by said number of input/output transactions.

23. A method as in claim 13 wherein said step of calculating said performance metrics comprises determining at least one of said performance metrics for a selected one of said initial model, said at least one additional model, a part of said initial model, and a part of said at least one additional model.

24. A method for designing a computer-based information system, comprising:

receiving descriptive input of a target information system, said descriptive input including descriptions of business processes and business functions;

validating said descriptive input to produce validated input;

transforming said validated input into quantitative input, said quantitative input including number and kind of hardware and software components for said target information system;

designing an initial multi-layer mathematical model of said information system, responsive to said transforming step, said layers of said initial model comprising a business layer an application layer, and a system/network layer, said business layer generating data for said application layer and said system/network layer, said application layer responsive to said generated data presenting service requests to said system/network layer, said system/network layer responsive to said generated data and said service requests generating processing and servicing data said processing and servicing data of said system/network layer factored into said business layer and said application layer, said initial model being designed prior to implementation of said target information system;

designing at least one additional multi-layer mathematical model derived from said quantitative input said additional model being designed prior to implementation of said target information system;

calculating performance metrics for said initial model and said at least one additional model at each layer;

comparing said performance metrics for said initial model and said at least one additional model; and selecting one of said initial model and said at least one additional model as a preferred information system design responsive to said comparing step.

* * * * *